(12) United States Patent
Nagel et al.

(10) Patent No.: US 8,512,095 B2
(45) Date of Patent: Aug. 20, 2013

(54) METHOD FOR MACHINING THAT COMBINES FINE BORING AND HONING AND MACHINING EQUIPMENT FOR THE EXECUTION OF THE METHOD

(75) Inventors: Bernd Nagel, Nurtingen (DE); Uwe-Peter Weigmann, Nurtingen (DE)

(73) Assignee: Nagel Maschinen- und Werkzeugfabrik GmbH (DE)

( * ) Notice: Subject to any disclaimer, the term of this patent is extended or adjusted under 35 U.S.C. 154(b) by 979 days.

(21) Appl. No.: 12/374,148

(22) PCT Filed: Jul. 17, 2007

(86) PCT No.: PCT/EP2007/006309
§ 371 (c)(1),
(2), (4) Date: Oct. 15, 2009

(87) PCT Pub. No.: WO2008/009411
PCT Pub. Date: Jan. 24, 2008

(65) Prior Publication Data
US 2010/0105292 A1    Apr. 29, 2010

(30) Foreign Application Priority Data
Jul. 19, 2006 (DE) .......................... 10 2006 034 497

(51) Int. Cl.
*B24B 49/10* (2006.01)
*B24B 33/06* (2006.01)
*B24B 51/00* (2006.01)

(52) U.S. Cl.
USPC .................................. 451/8; 451/51; 451/61

(58) Field of Classification Search
USPC ................................ 451/51, 27, 21, 8, 57, 58
See application file for complete search history.

(56) References Cited

U.S. PATENT DOCUMENTS

| 5,088,237 A | * | 2/1992 | Nagel et al. ...................... 451/27 |
| 5,269,103 A | * | 12/1993 | Nagel et al. ....................... 451/8 |
| 2003/0121138 A1 | * | 7/2003 | Ooe et al. ......................... 29/563 |

FOREIGN PATENT DOCUMENTS

| DE | 2810322 C2 | 9/1979 |
| DE | 4401496 A1 | 8/1995 |
| DE | 19919559 A1 | 11/2000 |
| DE | 103 15 218 A1 | 10/2004 |
| EP | 0 463 427 A2 | 1/1992 |
| JP | 9-254011 A | 9/1997 |
| JP | 2004-114236 A | 4/2004 |

* cited by examiner

*Primary Examiner* — Robert Rose
(74) *Attorney, Agent, or Firm* — Akerman Senterfitt

(57) ABSTRACT

According to a method for the fine machining of internal surfaces of bore holes in tools by fine boring and subsequent honing, the following steps are executed: Fine boring of at least one bore hole (131) in a tool (130) by means of a fine boring tool (128) of a fine boring device (120) for the creation of a fine bored hole; Transfer of the tool to a machining position of a honing device (140) for the machining of the fine bored bore hole by means of a honing tool (148A) of the honing device; Measurement of the fine bored bore hole with one of the measurement devices (160) allocated to the honing device in the machining position for the creation of at least one bore hole measurement signal representing the properties of the fine bored bore hole. The fine boring device is controlled subject to the bore hole measuring signal.

19 Claims, 2 Drawing Sheets

Figure 1:
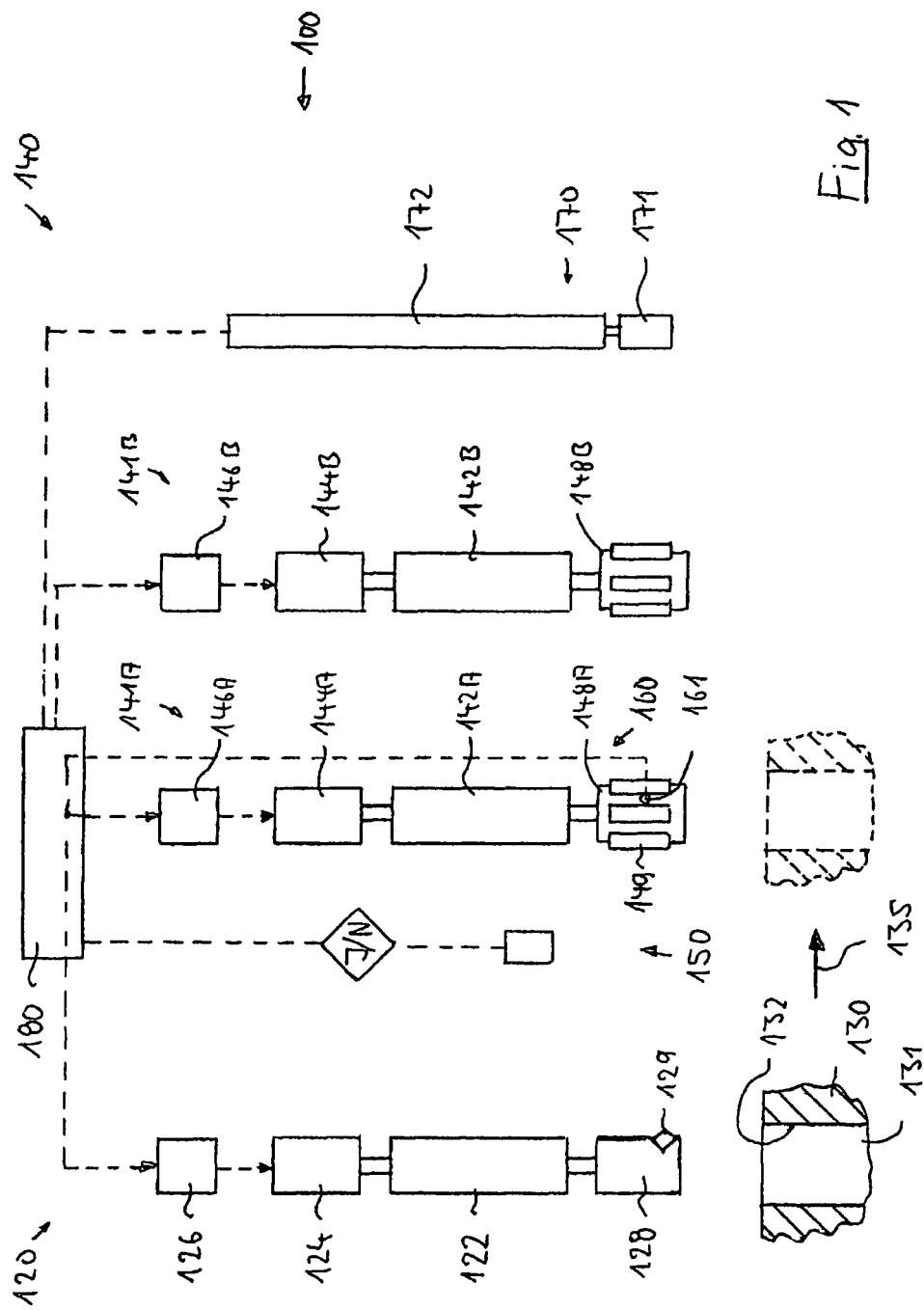

METHOD FOR MACHINING THAT COMBINES FINE BORING AND HONING AND MACHINING EQUIPMENT FOR THE EXECUTION OF THE METHOD

The invention relates to a method for fine machining of cylindrical internal surfaces of boreholes in workpieces by fine boring and subsequent honing, as well as to machining equipment for performing the method. The preferred field of application is the fine machining of substantially cylindrical plain bearing surfaces in components for engine building, particularly the machining of cylindrical bearing surfaces of an engine block or the machining of holes in connecting rods.

Conventional honing is a metal cutting method with geometrically undefined cutting edges, in which multiple cutting edge honing tools perform a cutting movement comprising two components, which leads to a characteristic surface structure of the machined internal surface with crossed over machining marks. Honing makes it possible to produce finish machined surfaces meeting extremely high demands with regards to dimensional and shape tolerances and with regards to the surface structure. Correspondingly, e.g. in engine building cylindrical bearing surfaces, i.e. the internal surfaces of cylinder bores in an engine block or in a cylinder liner to be installed in an engine block, bearing surfaces for shafts and cylindrical internal surfaces in connecting rod holes undergo honing. The machining of cylindrical bearing surfaces typically involves several different successive honing operations, e.g. rough honing with relatively strong material removal for producing the desired macroshape of the borehole and finish honing with a reduced material removal in order to produce the surface structure required on the finished workpiece.

Within the scope of the present application, the term "honing" is understood to mean not only conventional honing, but also other finish machining methods used for producing clearly defined surface characteristics and in particular surface structuring with the aid of laser radiation, which can be used in conjunction with conventional honing operation, the brushing of surfaces and/or the transformation of surface-near areas by means of a laser beam, also optionally combined with one or more conventional honing operations.

For preparing the workpieces to be machined for honing purposes, upstream of the honing operations can be introduced a rough machining by fine boring, which is sometimes also known as precision turning. For example, sometimes when machining connecting rods between the break separation and the honing serving as the finish machining operation, a precision turning operation is carried out. Suitable fine boring operations serve to fix the desired position and angular position of the borehole. Thus, in the subsequent honing operation of the borehole with a honing tool movably mounted by universal joint or limited in some other way the borehole axis fixed by the fine boring operation can be traced. An important task of the honing operation with a reduced allowance or oversize compared with the fine boring is the production of the requisite surface roughness, the cylindrical shape and the diameter.

Japanese patent application JP 2004-114236 A describes a method and a device for the fine machining of cylindrical bearing surfaces in engine blocks by fine boring and subsequent honing. The machining equipment used has a fine boring device with a fine boring work spindle to which a fine boring tool is fitted, as well as a honing device with two honing spindles, to which is fitted a rough honing tool or a finish honing tool. Between the fine boring work spindle and the honing spindle provided for rough honing is located a separate measuring system used for measuring the cylindricity of the fine bored borehole prior to honing. On the basis of the measurement result a cylindricity error is estimated. The subsequent honing operations are so controlled on the basis of the cylindricity determined that the cylindricity error can be corrected.

A combined fine boring and honing device with a fine boring spindle, an interposed measuring spindle and a single honing spindle is disclosed by Japanese patent application JP 09-254011.

The problem of the present invention is to provide a method for combined fine boring and honing of internal surfaces of boreholes, as well as a machining equipment suitable for performing the method, which in the case of simple construction of the machining equipment permit a rapid, highly precise machining of cylindrical internal surfaces by means of fine boring and subsequent single or multiple-stage honing.

These and other problems are inventively solved by a method having the features of claim 1 and a machining equipment having the features of claim 11. Advantageous further developments are given in the dependent claims. By express reference the wording of all the claims is made into part of the content of the description.

According to the invention, a method for the fine machining of internal surfaces of boreholes in workpieces by fine boring and subsequent honing involves the following steps:
fine boring at least one borehole of a workpiece by means of a fine boring tool of a fine boring device for producing a finely bored borehole,
transfer of the workpiece into a machining position of a honing device for machining the finely bored borehole by means of a honing tool of the honing device,
measuring the finely bored borehole by means of a measuring device associated with the honing device in the machining position for generating at least one borehole measurement signal representing the properties of the finely bored borehole and
controlling the operation of the fine boring device as a function of the borehole measurement signal.

A machining plant suitable for performing the method for the fine machining of cylindrical internal surfaces of boreholes in workpieces by fine boring and subsequent honing comprises:
a fine boring device with at least one fine boring spindle for carrying a fine boring tool and a fine boring control unit for controlling the operation of the fine boring device,
a honing device with at least one honing spindle set up for carrying a honing tool and a honing control unit for controlling the operation of the honing device,
in which the honing device has at least one measuring device for measuring a finely bored borehole machined by the fine boring device and for generating a borehole measuring signal representing the characteristics of the finely bored borehole and the fine boring control unit is configured for controlling the operation of the fine boring device as a function of the borehole measurement signal.

With regards to the method, a measuring device belonging to the honing device and located downstream of the fine boring operation is used to determine the machining result of the preceding fine boring operation. The borehole measurement signal can in particular contain information regarding the diameter and macroshape of the finely bored borehole present following fine boring, e.g. in connection with the dimensional accuracy, roundness, cylindricity and/or axial profiling (conicity, barrel shape, prewidth, etc.). Optionally information can be contained regarding the position of the borehole relative to a desired position and/or information concerning the surface characteristics.

The measurement of the finely bored borehole by means of a measuring device associated with the honing device, i.e. the initial check of the fine boring operation, takes place in the workpiece machining position provided for subsequent honing, so that a transfer from the fine machining device to the honing device can optionally take place without any intermediate stop and therefore very rapidly.

From the constructional standpoint the hitherto conventional separate measuring station between the fine boring device and the honing device and/or a measuring device associated with the fine boring device can be economized, because the initial check of the fine boring takes place with the aid of the measuring device belonging to the honing device.

It is e.g. possible to provide a honing device which contains an integrated measuring device, so as to permit an in-process diameter measurement for diameter uncoupling of the honing process and in-process correction of the borehole shape. Said in-process diameter measuring device can be used for establishing the diameter of the finely bored borehole prior to the start of honing or in the initial phase of honing in one or more measurement planes and to generate a corresponding borehole measurement signal describing the finely bored borehole. This borehole measurement signal (or a signal derived therefrom) can be returned to the fine boring device for compensating wear.

In many cases for the measurement of the finely bored borehole it is advantageous to have a relatively high measuring accuracy, so as to allow a precise control of the following honing operations. Preferably the finely bored borehole is measured with a measuring accuracy of less than 10 μm (relative to the diameter), the measuring accuracy being in particular in the range 2 to 6 μm.

In a method variant the finely bored borehole is measured with the aid of at least one measuring sensor fitted to the honing tool. The honing tool, i.e. the machining tool, consequently serves as a measuring sensor carrier, so that the associated honing spindle and its control unit can be used for introducing the measuring sensor into the finely bored borehole and optionally move the measuring sensor within the finely bored borehole for the measurement and then remove the same from the borehole when the measuring sensor measurement is concluded. This economizes significant constructional costs with respect to a separate measuring station.

Optionally, the measuring sensor fitted to the honing tool can at the end of the measurement of the finely bored borehole which has not yet been honed to monitor the advance of the subsequent honing operation. Thus, there can be a multiple use of the measuring device belonging to the honing device, whilst simultaneously reducing expenditure with respect to the means necessary for manipulating the measuring sensor.

In some honing processes, following the start of the honing process several tenths of a second or even entire seconds can elapse until the honing tool or the machining elements fitted to said honing tool and in particular honing strips and honing stones come into machining engagement with the workpiece surface and therefore modify the finely bored borehole. In addition, during the first tenths of a second or entire seconds of honing engagement there is only a slight modification to the borehole. Thus, the time between the start of the honing process and the start of substantial material removal can be used for the acquisition of the borehole measurement signal. Thus, in a further development, the borehole measurement signal is detected for describing the finely bored borehole when the honing process has already been started. It is also possible for the borehole measurement signal for describing the finely bored borehole to be completely detected prior to the start of the honing process i.e. when the latter has not yet been commenced. In some embodiments the detection or acquisition of the borehole measurement signal takes place prior to the start of the honing process and extends into the initial phase of the honing process, e.g. in the time when the machining elements of the honing tool are infed with a relatively high infeed rate in the direction of the surface to be machined and before actual machining engagement starts. If at least part of the measurement time necessary for acquiring the borehole measurement signal occurs in the phase following the start of the honing process, there is a considerable time gain and machining times can be shortened.

With regards to the measuring device associated with the honing device, use can be made of different measuring principles either alternatively or in combination. In some embodiments, the measuring device is a pneumatic measuring system (also called an "air measuring system"). Measuring devices with tactile measuring sensors (tracer pins, etc.), capacitive, inductive and/or optical measuring principles are also possible.

In some method variants at the end of the fine boring operation the workpiece is transferred directly from the fine boring device into the machining position at the honing device. The situation can in particular be such that in the material flow direction between the fine machining device and the honing device there is no measuring device for quantitative dimensional measurement of the finely bored borehole.

Optionally on the transfer path there can be a "bored control" which, in the sense of a yes/no decision, establishes whether a regular fine boring operation has taken place, so that at the start of the subsequent honing operation the honing tool can be inserted in the borehole without colliding with the workpiece. This checking device can be constructed in a simple and inexpensive manner, because no precise dimensional measurement of the borehole is needed.

In some embodiments the honing device comprises a measurement checking device for measuring the honed borehole following the end of the single or multiple-stage honing operation. The measurement checking device generates one or more measurement checking signals from which information can be derived regarding the diameter, macroshape and/or surface characteristics of the honed borehole. This information can be used for qualifying the finish machined workpiece.

The measurement checking device can be designed as a stationary measuring device with a higher measuring accuracy than the highly dynamic measuring devices for in-process measurement during honing.

In a further development the measurement checking device is connected in signal-transmitting manner with a honing control unit provided for controlling the honing operations and the honing control unit is configured for controlling the operation of the honing device as a function of measurement signals of the measurement checking device. As the measurement checking device allows a stationary, highly accurate measurement detached from the machining process, the return of the measurement checking signals to the honing control unit can be used for further increasing machining accuracy, so as to e.g. reduce the diameter spread of the machined workpieces. This makes it possible to attain greater stability of the machining method with lower reject rates and closer tolerances. This additional measurement checking and signal return have proved very advantageous, even if an in-situ measurement of the honed borehole can take place during the honing operation by means of the measuring sensors provided on the honing tools.

These and further features can be gathered from the claims, description and drawings and individual features, both singly and in the form of subcombinations, can be implemented in an embodiment of the invention and in other fields and can represent advantageous, independently protectable constructions. Embodiments of the invention are subsequently described relative to the drawings, wherein show:

FIG. 1 A diagrammatic view of an embodiment of a machining equipment for combined fine boring and honing of cylindrical internal surfaces of boreholes in workpieces.

Figure 2:
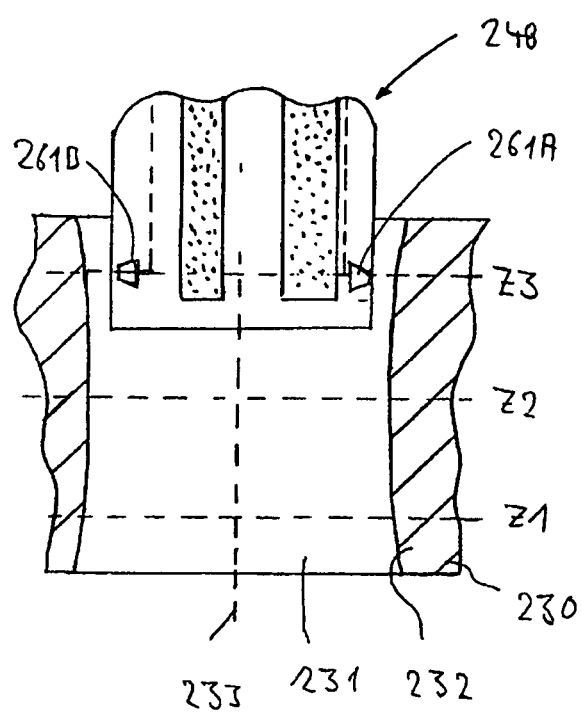

FIG. 2 An axial section through a substantially cylindrical borehole, which has following the end of the fine boring operation a cylindricity error with terminal diameter extensions and measured in three axial spaced measurement planes.

FIG. 1 diagrammatically illustrates an embodiment of a machining equipment 100 for the fine machining of cylindrical internal surfaces of boreholes in workpieces by fine boring and subsequent honing. The machining equipment comprises a fine boring device 120 and a honing device 140, which in the present case are built up on a common, not shown machine bed, but in other embodiments can also be installed on separately set up machine beds.

The fine boring device 120 comprises a fine boring spindle 122, whose rigid spindle axis is oriented substantially vertically and is moved vertically with the aid of a spindle drive 124 and can be rotated about the spindle axis. To the free lower end of the fine boring spindle is rigidly coupled a fine boring tool 128, to whose circumference is fitted a hard metal bit or insert serving as a drill point 129. With the aid of a not shown adjusting device it is possible to adjust the radial position of the drill point and consequently the diameter of the borehole to be finely bored is fixed. The axial and rotary movements of the fine boring spindle and the infeed of the drill point are controlled by means of a fine boring control unit 126. In the case of typical fine boring operations working takes place with rotation speeds between approximately 1000 and approximately 3000 rpm and feed rates between approximately 200 and approximately 1000 in/min. Typical cutting depths (material removal), relative to the diameter, are normally between 0.1 and 1 mm. In exceptional cases variations from these typical parameter ranges are possible.

The two-spindle honing device 140 comprises two substantially identically constructed honing units 141A and 141B. Each of the honing units has a vertical honing spindle 142A, 142B respectively, which are so driven by means of a spindle drive 144A, 144B respectively that the honing spindle during honing performs vertically oscillating working movements, on which is superimposed a rotary movement about the vertical rotation axis. A first honing control unit 146A or a second honing control unit 146B control the working movements of the honing spindles. To the lower free end of the first honing spindle 142A is coupled with a limited movement a first honing tool 148A with which immediately following on to the fine boring operation it is possible to perform a rough honing operation on the finely bored borehole. The second honing tool 148B is designed for a finish honing operation with which it is possible to obtain the sought macroshape and surface structure of the finely machined borehole. As the structure of such honing units is to this extent fundamentally known, no further explanation is given here.

The honing device 140 has several checking and measuring systems for checking or measuring the machined workpiece during and following honing. Between the fine boring device 120 and the first honing unit 141A is provided a borehole checking device 150 which establishes whether the workpiece coming from the fine boring device has been brought by the latter into the expected macroshape allowing a subsequent honing through honing units 141A, 141B. With the aid of the borehole checking device 150 it is in particular possible to carry out a "bored check", in order to e.g. establish whether the drill point 129 of the fine boring device is still substantially intact or has been worn or broken beyond the tolerance limits. In the case of a drill point break the detected diameter of the borehole coming from the fine boring device would be significantly lower than that following a correct fine boring process, so that the following honing operations would be made more difficult or in the least favourable case impossible. Moreover, with small boreholes at the start of honing collisions can occur between the first honing tool 148A and the workpiece and such collisions must be avoided. Since for the bored check only a qualitative or roughly quantitative examination with a precision of roughly 50 μm or above is adequate, the borehole checking device can have a relatively simple construction. Suitable borehole checking devices are present on many conventional honing equipments and can be used for such a purpose.

The honing device also has a measuring device 160 integrated into the first honing unit 141A and it is used both for the initial check of the finely bored borehole coming from the fine boring device and for monitoring the machining advance during the first honing operation. The measuring device 160 is designed as a pneumatically functioning "air measuring device". It comprises a pair of measuring nozzles 161, which are placed in diametrically facing manner between the honing strips 149 on honing tool 148A. To the measuring nozzles is supplied an air flow, e.g. by means of a ring distributor. The air pressure prevailing in the system is analyzed within the measuring device and makes it possible to measure the distance between the air measuring nozzles 161 and the wall of the borehole. The measurement range of typically suitable air measuring systems generally extends up to approximately 150 μm (in special cases up to approximately 300 μm), the dynamic system making it possible to obtain measuring accuracies roughly between approximately 2 μm and 5 μm.

The second honing unit can also have a correspondingly constructed measuring device or one functioning according to some other measuring principle with measuring sensors integrated into the honing tool 148B. However, for the present invention it is also possible to have a construction without an integrated measuring device.

A measurement checking device 170 is fitted downstream of the honing units in the material flow direction and to it belongs a measurement checking head 171, which with the aid of a measuring screw or spindle 172 can be inserted in the finish honed borehole, optionally can be moved within said borehole and can then be extracted from the borehole. The measurement checking device 170 is connected in signal-conducting manner with the master control unit 180 of the honing device, so that information concerning the diameter, macroshape and surface characteristics of the borehole contained in the measurement checking signal of the measurement checking device can be processed by means of the honing control unit 180 and used for controlling honing with the aid of the honing spindles.

The fine boring control unit 126 is connected in signal-conducting manner to the control unit 180 of the honing device. As a result it is possible to process the signals emanating from the measuring device 160 of the honing device for controlling the operation of the fine boring device. The functions of the fine boring control unit 126 and the control unit 180 of the honing device can be integrated within an overall control device of the machining equipment, e.g. in a control computer. On interposing a suitable interface a separate configuration is also possible, so that optionally a substantially autarchically constructed fine boring device can be used together with a substantially autarchically constructed honing device for the construction of the inventive machining equipment, if the possibility exists of returning the borehole measurement signal of the honing device to the fine boring device.

Machining equipment 100 can function in the following way. The operation of the machining equipment is described in exemplified manner relative to the machining of an engine block 130 for an internal combustion engine and which contains several cylinder bores 131, whose internal surfaces 132 are to be machined by fine boring and subsequent honing, so that at the end of honing they can be used as sliding partners for the piston rings of the engine. Workpiece 130 is clamped to a not shown clamping plate and is moved with the aid of suitable conveying devices in material flow direction 135 to and from the individual machining stations of the machining equipment.

Firstly the workpiece 130 for the fine boring operation is brought into a machining position making it possible to introduce the fine boring tool 128 by a vertical downward movement of the fine boring spindle into the borehole 131. The borehole 131 is then finely bored using the fine boring tool 128 in order to produce a finely bored borehole, which compared with the sought desired shape at the end of honing has a small diameter undersize of e.g. 80 µm. To obtain the desired diameter the radial position of the drill point is infed to the desired end value with the aid of the fine boring control unit 126. At the end of fine boring the drill point is retracted and the fine boring tool is removed upwards out of the finely bored borehole.

Workpiece 130 is then moved into the vicinity of the borehole checking device 150. The latter checks by means of a checking sensor whether the diameter of the finely bored borehole is above a predetermined limit value, so that it is safely possible to introduce the honing tools into the following honing stages. If during fine boring the drill point breaks or the fine boring tool as a result of wear is no longer in a position to produce an adequate internal diameter, the not adequately drilled workpiece is removed from the material flow. In this case the checking device is constituted by a disk having an external diameter, which can just be inserted into the smallest borehole diameter possible for ensuring a satisfactory honing process. With the aid of an end position check, a binary sensor establishes whether the checking device has been completely inserted in the borehole. If the borehole is too narrow, the disk cannot be inserted, so that the final position sensor does not emit an enabling signal (good signal).

Workpieces with adequate internal dimensions of the finely bored borehole are moved into the machining position, shown in broken line form, below the first honing unit 141A so as to enable honing tool 148A to be inserted by lowering the honing spindle into the finely bored borehole.

By lowering the first honing spindle 142A, then the first honing tool 148A is inserted in the finely bored borehole. Using measuring device 160 there is then a quantitative dimensional measuring of the finely bored borehole, the measurement result being forwarded in the form of borehole measurement signals to the control unit 180 of the honing device. It is configured in such a way that the borehole measurement signal or a signal derived therefrom can be transmitted to the fine boring control unit 126, so that the fine boring device 120 can be controlled via the fine boring control unit as a function of the borehole measurement signal. An example for a high precision, dimensional measurement of a finely bored borehole will be explained in greater detail relative to FIG. 2.

In many cases between the program controlled start of the honing operation and the start of a substantial material removal through honing, a few tenths of a second and even entire seconds elapse and are necessary to bring the infeedable machining elements present on the honing tool from their retracted position radially outwards into machining engagement with the borehole inner wall to be machined. Within this time slot or window admittedly the honing tool is already partly or completely inserted in the borehole, but material removal has not yet commenced, so that the finely bored borehole has not or has not significantly changed. In advantageous variants this time is used for the acquisition of borehole measurement signals, so that e.g. the measurement can at least temporarily take place at the same time as the infeed of the machining tool at the honing tool. Optionally the measurement can take place uninterruptedly up to the initial phase of material removal, so that optionally there can be a seamless transition between the acquisition of the borehole measurement signal for the initial check of the fine boring operation and an in-process measurement of the subsequent honing operation.

Immediately following the end of the fine boring operation and prior to the start of the material-removing honing operation, the measuring device 160 of the honing device always serves as an initial check for monitoring the machining result of the fine boring operation and simultaneously as an initial check for the subsequent honing operation. If the borehole measurement signal reveals that the macroshape of the finely bored borehole obtained through fine boring is not within a predetermined tolerance range, the operation of the fine boring device can be so controlled, e.g. by adjusting the radial stop position of the drill point 129, that during the subsequent machining of the next workpiece the resulting macroshape of the finely bored borehole falls within the desired tolerance range at the end of the fine boring operation.

Following said initial check of fine boring and the initial check for the honing operation, the first honing unit 141A commences the rough honing operation when the internal surface 132 of the borehole 131 acquires a surface structure with crossed machining marks modified compared with the fine boring and also a macroshape closer to the desired shape with a slightly larger internal diameter. The rough honing operation machining result can be checked during rough honing and/or following the end of rough honing with the aid of measuring device 160. On the basis of the corresponding measurement signal the rough honing operation can be ended if the macroshape sought from rough honing or the diameter of the borehole sought from rough honing is reached.

Then the first honing tool 148A is removed from the borehole and the workpiece is moved into a machining position associated with the second honing unit 141B and which permits an insertion of the second honing tool 14813 into the borehole. After lowering the second honing tool 148B into the borehole the material-removing finish honing operation is carried out and as a result the borehole acquires the desired shape and surface structure. The finish honing operation can also be monitored with the aid of a measuring device and optionally controlled as a function of a corresponding measurement signal.

Following the end of the finish honing operation and the retraction of the second honing spindle from the workpiece, the latter is moved in the direction of the measurement checking device 170, which is set up so as to measure the finished, fi-finely machined borehole 131 and monitor whether the diameter, macroshape of the borehole 131 and/or surface structure of the internal surface 132 satisfy the machining process specifications. Through the return of corresponding measurement check signals to the honing machine control unit 180 it is possible to improve the constancy of the machining method, so that machined borehole quality variations can be reduced when compared with conventional machining equipments.

An example of a high precision, dimensional measurement of a finely bored borehole 231 in a workpiece 230 is to be explained in greater detail relative to FIG. 2. The ideally circular cylindrical internal surface 232 has a shape significantly differing from a circular cylindrical shape as a result of the fine boring process and with a wasp waist in the axial central area of the borehole and with diameter increases towards the in each case open end regions of the borehole. After moving the workpiece into the vicinity of the first honing unit, the honing tool 248 is lowered to such an extent into the borehole 231 until diametrically facing air measuring nozzles 261A, 261B of the measuring device have reached a measurement plane Z3 in the vicinity of the spindle-facing, upper entrance area of borehole 231. After stopping the vertical advance or feed movement; the honing tool 248 is rotated in the borehole substantially symmetrically around the borehole axis 233 by at least 180ø in order to determine the borehole diameter on plane Z3. With the aid of a rotation value indicator for the honing spindle, it is possible to detect the rotation angle values of the honing tool associated with the diameter values, so that also an angle-resolving measurement of the diameter in the vicinity of the given measurement plane is possible. This provides information concerning the borehole shape in the measurement plane. At the end of the measurement the honing tool is further lowered so that the measuring sensors 261A, 261B are located in the axial central area of the borehole at measurement plane Z2. The corresponding, optionally angle-resolving diameter measuring process is then repeated. A third measurement then takes place on plane Z1 in the vicinity of the spindle-remote end of the borehole. The measurement results are evaluated for determining the macroshape of the borehole. If this evaluation reveals that the macroshape is outside the specification for the fine boring process, by displacement of the drill point the fine boring tool is set up again or replaced, so that on the following workpiece the macroshape of the finely bored borehole falls within the specification.

The machining equipment and the method described make it possible to implement a very stable machining process, in which the machined workpieces are subject to only very small quality fluctuations. Any variations from the ideal machining process particularly due to machining tool wear can be speedily detected and can be quickly compensated by adjusting and/or replacing the machining tools with the aid of the return of the corresponding measurement signals to the individual machining units.

The invention has been explained with the aid of an embodiment, in which following fine boring the honing device carries out conventional honing with axially oscillating and rotary movement of the honing tool. In other embodiments on the honing device are provided further devices for producing clearly defined surface characteristics. It is e.g. possible to integrate a laser unit in order to carry out a surface structuring by means of laser radiation. Laser irradiation can also be used in order to transform in large-area manner, e.g. harden surface-near areas of the machined workpiece surface as a result of an introduction of energy. It is also possible to integrate a brush mechanism for brushing the surfaces. In other embodiments, when producing clearly defined surface structures and other clearly defined surface characteristics, there is a complete lack of need to use conventional honing, in that e.g. one or more of the aforementioned methods are used for the ultra-fine machining of the surfaces in the honing device. Thus, the terms "honing device" and "honing tool" serve to represent finish machining methods or finish machining tools which can be used following a fine boring operation in order to machine the finely bored borehole with or without cutting action and bring it into a sought final state.

The invention claimed is:

1. A method for the fine machining of internal surfaces of boreholes in workpieces by fine boring and subsequent honing, the method comprising:
fine boring of at least one borehole of a workpiece by means of a fine boring tool of a fine boring device for producing a finely bored borehole,
transferring the workpiece into a machining position of a honing device for machining the finely bored borehole by means of a honing tool of the honing device,
measuring the finely bored borehole by means of a measuring device associated with the honing device in the machining position for generating at least one borehole measurement signal representing characteristics of the finely bored borehole; and
controlling the operation of the fine boring device as a function of the borehole measurement signal.

2. The method according to claim 1, wherein the transfer of the workpiece from the fine boring device into the machining position on the honing device is carried out without an intermediate stop.

3. The method according to claim 1, wherein following fine boring and prior to the measurement of the finely bored borehole a bored check is carried out on the finely bored borehole.

4. The method according to claim 1, wherein the measurement of the finely bored borehole at least partly or completely takes place prior to a start of subsequent honing.

5. The method according to claim 1, wherein the measurement of the finely bored borehole takes place at least partly following a start of a honing operation in an initial phase of said honing operation prior to the start of a substantial, material-removing machining by the honing operation.

6. The method according to claim 1, wherein the measurement of the finely bored borehole takes place with a measuring accuracy of less than 10 µm.

7. The method according to claim 1, wherein the finely bored borehole is measured with the aid of at least one measuring sensor fitted to a honing tool.

8. The method according to claim 7, wherein the measuring sensor fitted to the honing tool, at the end of the measurement of the finely bored borehole, is used to monitor the advance of a subsequently performed honing operation.

9. The method according to claim 1, wherein the finely bored borehole is measured by at least one of a pneumatic measuring device, a measuring device with at least one tactile sensor, a measuring device with at least one capacitive sensor a measuring device with at least one inductive sensor, and a measuring device with at least one optical sensor.

10. The method according to claim 1, wherein the honed borehole at the end of the honing operation is measured for generating at least one measurement check signal and a control of the operation of the honing device takes place as a function of the measurement check signal.

11. Machining equipment for the fine machining of cylindrical internal surfaces of boreholes in workpieces by fine boring and subsequent honing comprising:

a fine boring device with at least one fine boring spindle set up for carrying a fine boring tool, and with a fine boring control unit for controlling the operation of the fine boring device;

a honing device with at least one honing spindle set up for carrying a honing tool, and with a honing control unit for controlling the operation of the honing device;

the honing device comprising at least one measuring device for measuring a finely bored borehole machined by the fine boring device, the measuring device generating a borehole measurement signal representing the characteristics of the finely bored borehole, wherein the fine boring control unit is configured to control the operation of the fine boring device as a function of the borehole measurement signal.

12. The machining equipment according to claim 11, wherein the measuring device for measuring the finely bored borehole is set up in such a way that the measurement is performed in the workpiece machining position intended for the subsequent honing operation.

13. The machining equipment according to claim 11, wherein there is no measuring device for quantitative dimensional measurement of the finely bored borehole in a material flow direction between the fine boring device and the honing device.

14. The machining equipment according to claim 11, wherein the measuring device comprises at least one measuring sensor fitted to the honing tool.

15. The machining equipment according to the claim 11, wherein the measuring device is set up in such a way that the finely bored borehole is measured with a measuring accuracy of less than 10 μm.

16. The machining equipment according to claim 11, wherein the measuring device is designed as one of a pneumatic measurement device, a capacitive measurement device, an inductive measurement device, and an optical measuring device.

17. The machining equipment according to claim 11, wherein a borehole checking device for a qualitative or roughly quantitative inspection of the finely bored borehole for errors or faults of the fine boring operation is arranged between the fine boring device and a first honing unit of honing device.

18. The machining equipment according to claim 11, wherein a measurement check device is provided for measuring the honed borehole at the end of the honing operation and for generating at least one measurement check signal.

19. The machining equipment according to claim 18, wherein the measurement check device is connected in signal-transmitting manner to a honing control unit provided for controlling the honing operations, and the honing control unit is configured for controlling the operation of the honing device as a function of the measurement check signals of the measurement check device.

* * * * *